(12) United States Patent
Vasudeva

(10) Patent No.: US 6,572,311 B2
(45) Date of Patent: Jun. 3, 2003

(54) TWO-PIECE DRILL BITS

(75) Inventor: Kailash C. Vasudeva, Waterloo (CA)

(73) Assignee: Maxtech Manufacturing Inc., Waterloo (CA)

( * ) Notice: Subject to any disclaimer, the term of this patent is extended or adjusted under 35 U.S.C. 154(b) by 0 days.

(21) Appl. No.: 09/910,820

(22) Filed: Jul. 24, 2001

(65) Prior Publication Data
US 2002/0009341 A1 Jan. 24, 2002

Related U.S. Application Data
(60) Provisional application No. 60/220,162, filed on Jul. 24, 2000.

(51) Int. Cl.⁷ ............................................... B23B 51/02
(52) U.S. Cl. ................... 408/226; 76/108.6; 408/239 A
(58) Field of Search ................................ 408/226, 227, 408/238, 239 A; 279/103, 143, 145; 76/108.1, 115, 108.6

(56) References Cited

U.S. PATENT DOCUMENTS

| | | | | |
|---|---|---|---|---|
| 879,631 A | * | 2/1908 | Gregson | 408/226 |
| 2,087,814 A | * | 7/1937 | Rawlings | 279/103 |
| 3,053,118 A | * | 9/1962 | Lavallee | 408/226 |
| 5,074,025 A | * | 12/1991 | Willard, III | 279/103 |
| 5,797,711 A | * | 8/1998 | Mulgrave et al. | 279/14 |
| 6,058,807 A | * | 5/2000 | Fujii et al. | 408/226 |

FOREIGN PATENT DOCUMENTS

| | | | | |
|---|---|---|---|---|
| CH | 53632 | * | 10/1910 | 408/226 |
| DE | 2811977 A1 | * | 9/1979 | 408/226 |
| DE | 4014381 A1 | * | 11/1991 | 408/226 |
| JP | 336907 A | * | 11/1992 | 408/226 |

* cited by examiner

Primary Examiner—Daniel W. Howell
(74) Attorney, Agent, or Firm—R. Craig Armstrong; L. Anne Kinsman; Broden Ladner Gervais LLP

(57) ABSTRACT

Two-piece drill bits and methods of manufacturing same provide a preferably hexagonal shank, and a drill portion having a proximal end inserted into an axial hole in a distal end of the shank. In a preferred embodiment, at least part of the area adjacent the proximal end of the drill portion is knurled. Alternative embodiments have wings, polygons, tapers or other irregular shapes, or combinations of same. A variety of means may be employed to mechanically capture the drill portion in the shank.

14 Claims, 11 Drawing Sheets

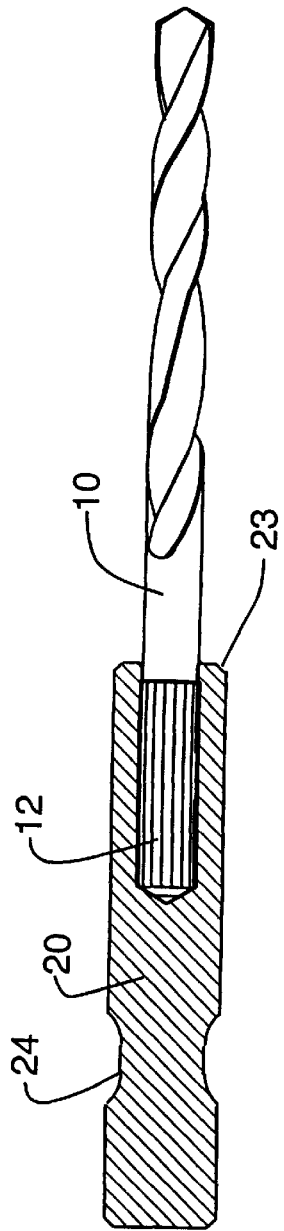
FIG.2A
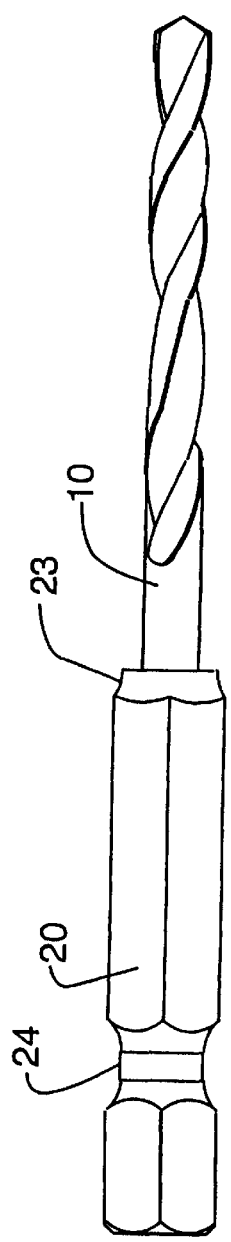
FIG.2B
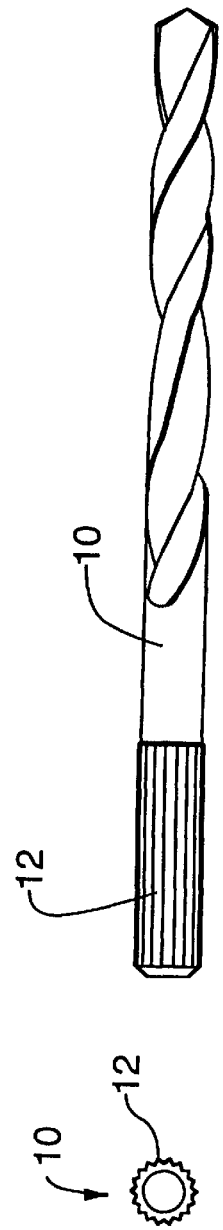
FIG.2C
FIG.2D

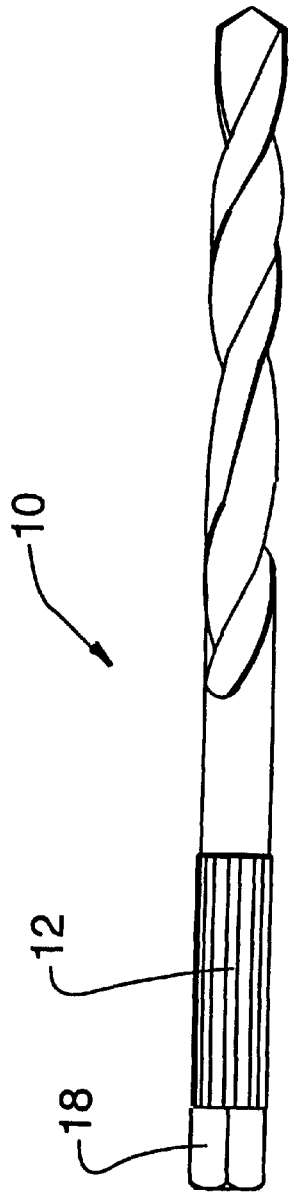
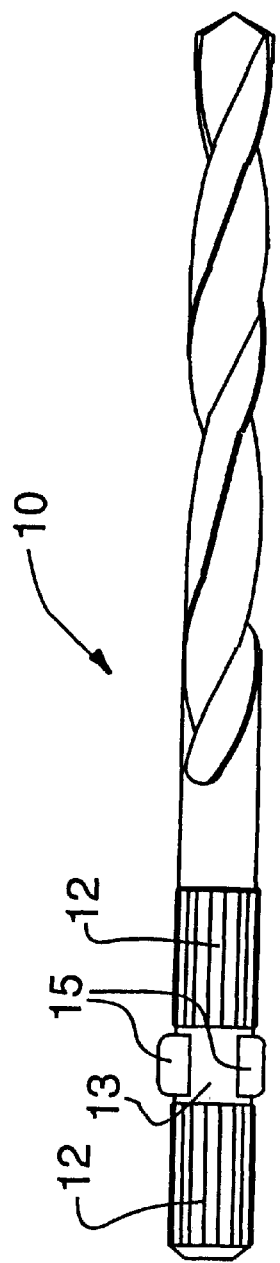
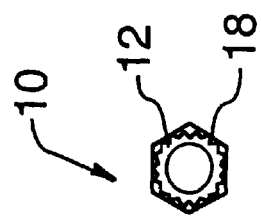
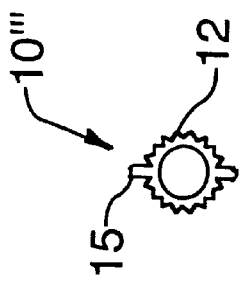

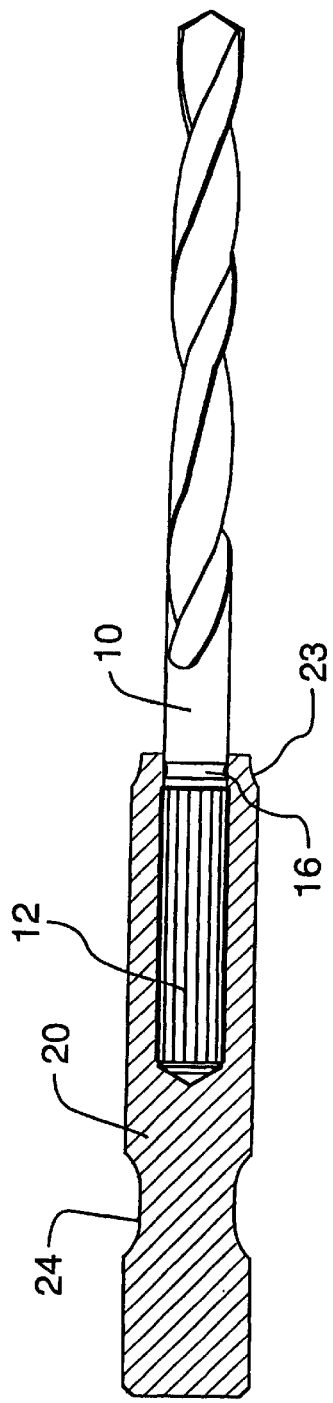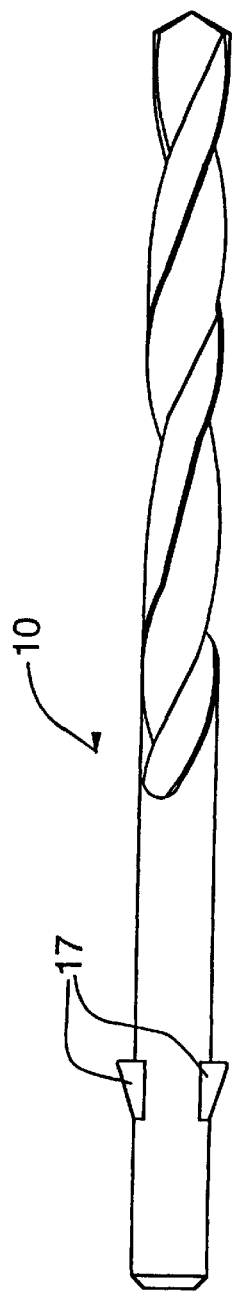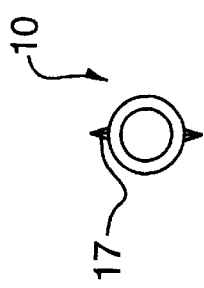
FIG.6A
FIG.6B
FIG.7A
FIG.7B

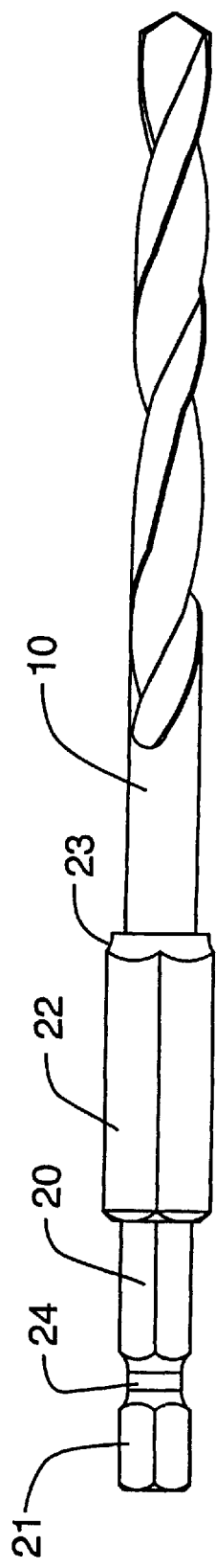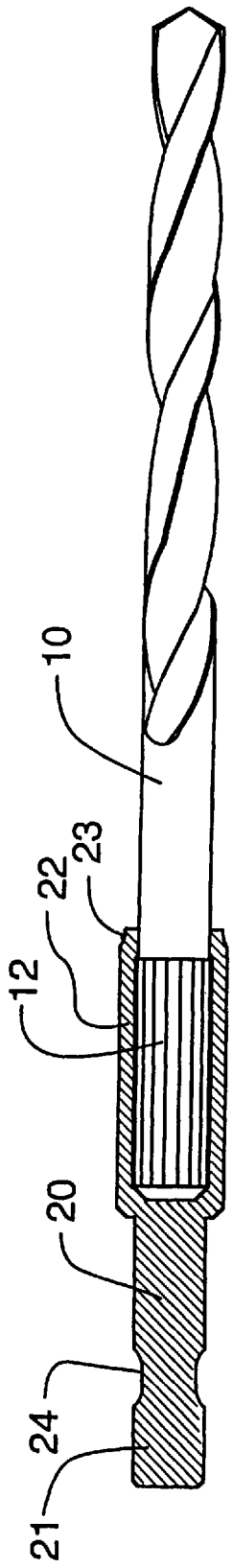

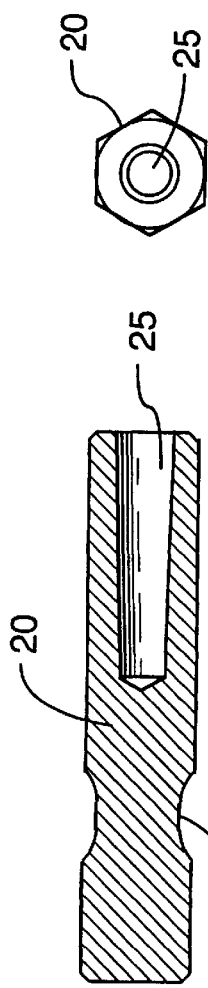
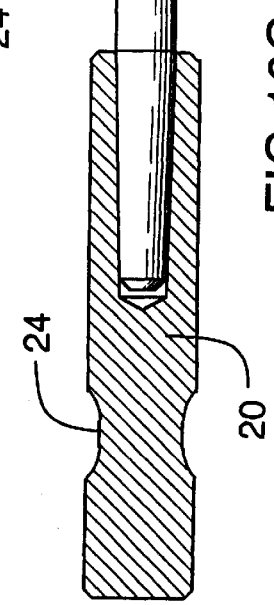
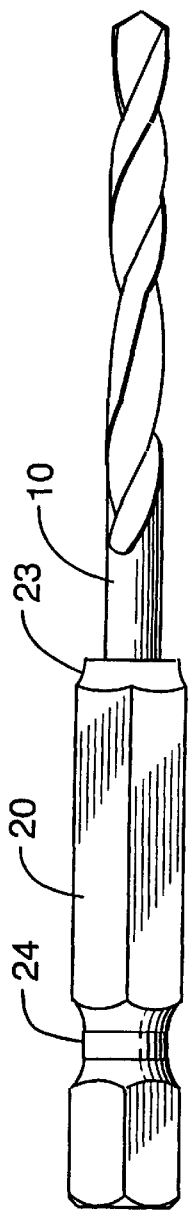
FIG.10A  FIG.10B  FIG.10C  FIG.10D  FIG.10E

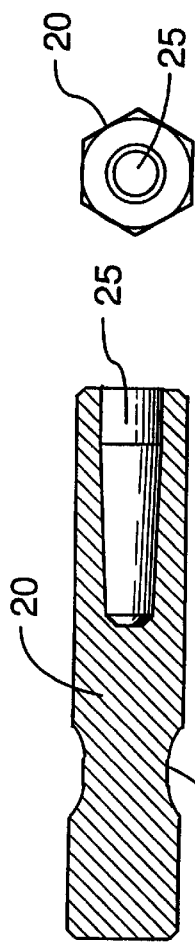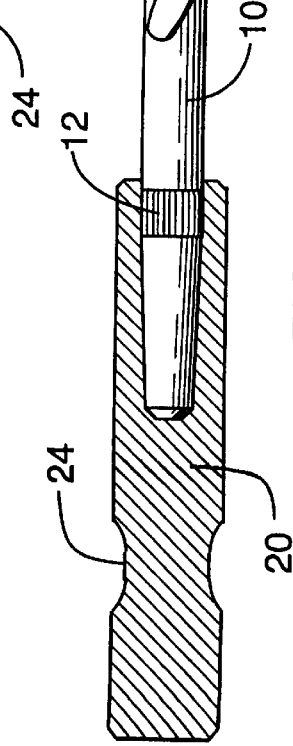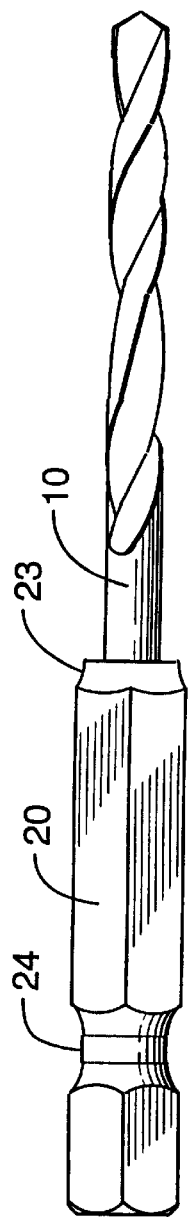

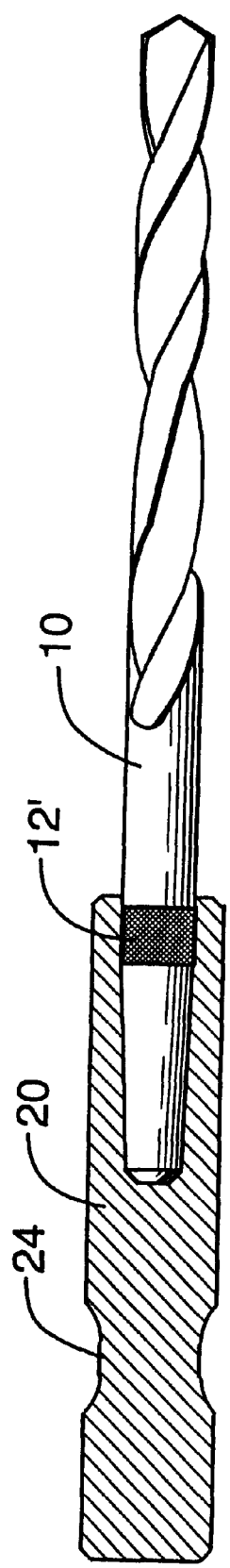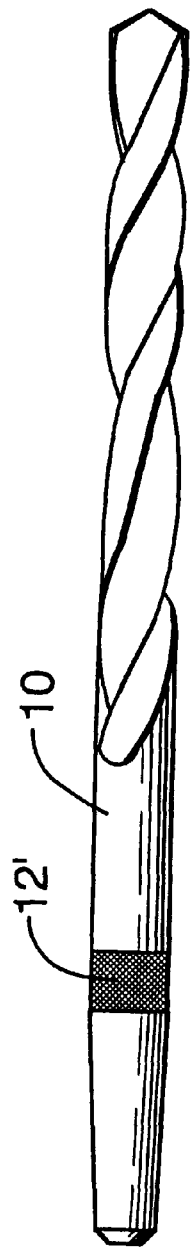
FIG. 12A
FIG. 12B

TWO-PIECE DRILL BITS

This application claims the benefit of Provisional Application No. 60/220,162 filed Jul. 24, 2000.

BACKGROUND OF THE INVENTION

This invention relates to two-piece drill bits, having a shank portion and a drill portion.

Two-piece drill bits are known in the prior art, and commonly have a hexagonal shank for mounting in a suitable holder or chuck. Several different structures and methods of manufacture are known. For example:

(1) Cutting a hex shaft to length and drilling an axial hole at a distal end. A flat is ground/machined onto the shank of the drill part, which is inserted into the drilled hole of the hex shaft. The shaft is then swaged at the position where the flat is, so that the displaced material is lodged against the flat of the drill shank to secure it inside the hole of the hex shaft. There are at least two perceived disadvantages with this method. To enable insertion, the hole has to be drilled over-size to accept the drill shank. After swaging, the shank is shifted to one side, there is thus a loss of capacity of the drill with respect to the hex shaft. Furthermore, after swaging again one side of the hex shaft is flattened, resulting in loss of the hex profile at that part of the hex shaft. This may make it difficult for the drill bit assembly to be inserted into ordinary hex-shank holder tools available in the market.

(2) Cutting a hex shaft to length and drilling an axial hole at a distal end. Introducing adhesive in the drilled hole and inserting a drill shank by pressing and letting the adhesive dry. The method may not provide a drill bit having the required strength for most applications, because during heavier use, the drill shank may spin around inside the drilled hole of the hex shaft.

(3) Drill shanks are arranged and held in a die having cavities that are of the same shape as regular hex shafts. The shank of the drill bit is then cast (usually of Zinc/Zinc alloy) around the drill shanks and left to cool. Because the cast material is softer than the drill shanks, the shank of the drill bit wears prematurely and cannot maintain its shape after repeated use. Also the centring of the drill shank in the hex shaft can become disturbed after wearing out the shank material. Furthermore, after casting and removal of the die, there is usually left some extra material at the die parting line (usually on both sides of the hex shaft). These imperfections may cause improper positioning of the drill bit in drill chucks or tool hex mounts, with the subsequent run-out and concentricity problems during use.

(4) Cutting a hex shaft to length and drilling an axial hole at a distal end. The drill shank is then pressed into the hole and the shank is cross-drilled (radially through the shank) and a pin inserted through the radial hole to secure the drill shank. In case a smaller diameter drill is used, the radial hole is tapped so a set-screw may be used to retain the drill shank in the hex shaft. This method is time-consuming and expensive because of all the steps involved. Also, the method yields drill bit assemblies which are non-concentric and difficult to insert into hex tool holders, especially when the ends of the pin or set-screw are not flush with the outer flat surface of the hex shaft.

SUMMARY OF THE INVENTION

It is an object of the invention to provide economical and effective alternative structures and methods of manufacturing two-piece drill bits.

In the invention, an axial hole is drilled into the distal end of a preferably hexagonal shank. The proximal end of the drill portion is inserted in the axial hole and is secured in the hole by one or more of a variety of mechanical means as described in greater detail below.

In the preferred embodiment, at least a portion of the proximal end section of the drill portion is knurled, and the shank is compressed tightly against the proximal end section of the drill portion, for example by rolling or roll-peening.

In the method of the invention, a knurled portion is formed on at least a portion of the proximal end section of the drill portion, shanks of a suitable length are drilled with an axial hole at a distal end, the proximal end section of the drill portion is inserted into the axial hole, and at least a portion of the shank is mechanically deformed to symmetrically compress the shank onto the drill portion, for example by rolling, roll-peening, or differential expansion in heating and cooling.

Additional features of the invention will be described or will become apparent in the course of the following detailed description.

BRIEF DESCRIPTION OF THE DRAWINGS

The invention will now be described in detail, with reference to the accompanying drawings by way of example only, in which:

FIG. 2A is a partially sectioned side view of a second embodiment of a drill bit according to the invention, FIG. 2B is a side view of the drill bit according to FIG. 2A, FIG. 2C is a side view of a drill portion according to FIG. 2A, FIG. 2D is am end view of the drill according to FIG. 2C, showing the knurled end of the drill, FIG. 4A is a side view of a third embodiment of a drill according to the invention, FIG. 4B is an end view of the drill according to FIG. 4A, showing the knurled end of the drill, FIG. 5A is a side view of a fourth embodiment of a drill according to the invention, FIG. 5B is an end view of the drill according to FIG. 5A, showing the knurled end of the drill, FIG. 6A is a partially sectioned side view of a fifth embodiment of a drill according to the invention, FIG. 6B is a side view of the drill according to FIG. 6A, FIG. 7A is a side view of a sixth embodiment of a drill according to the invention, FIG. 7B is an end view of the drill according to FIG. 7A, showing the winged end of the drill, FIG. 9A is a side view of an eighth embodiment of a drill bit according to the invention, FIG. 9B is a partially sectioned side view of the drill bit according to FIG. 9A, FIG. 10A is a sectional side view of a shank having a tapered axial hole, FIG. 10B is a distal end view of the shank of FIG. 10A, FIG. 10C is a partially sectional side view of the assembled drill bit, FIG. 10D is a side view of the assembled drill bit, FIG. 10E is a side view of the drill portion, FIG. 11A is a sectional side view of a shank having a tapered axial hole, and knurling, FIG. 11B is a distal end view of the shank of FIG. 11A, FIG. 11C is a partially sectional side view of the assembled drill bit, FIG. 11D is a side view of the assembled drill bit, FIG. 11E is a side view of the drill portion, FIG. 12A is a sectional side view of a shank having a tapered axial hole, and an alternative form of knurling, and FIG. 12B is a side view of the drill portion of FIG. 12A.

DETAILED DESCRIPTION

Figure 1A:
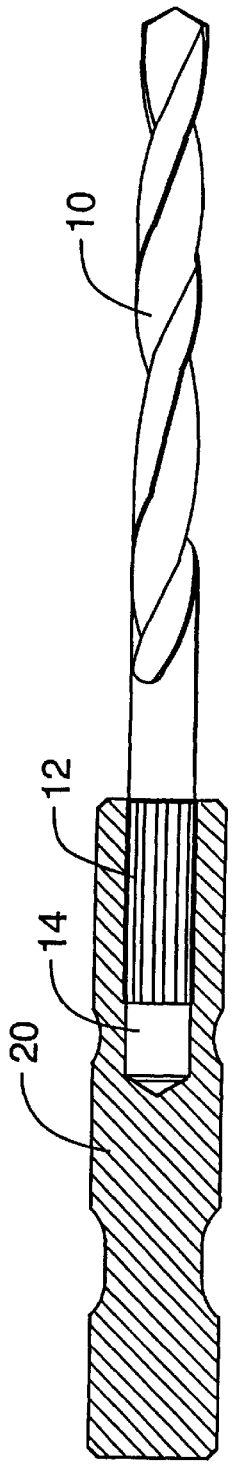
FIG. 1A is a partially sectioned side view of a first embodiment of a drill bit according to the invention.
Figure 1B:
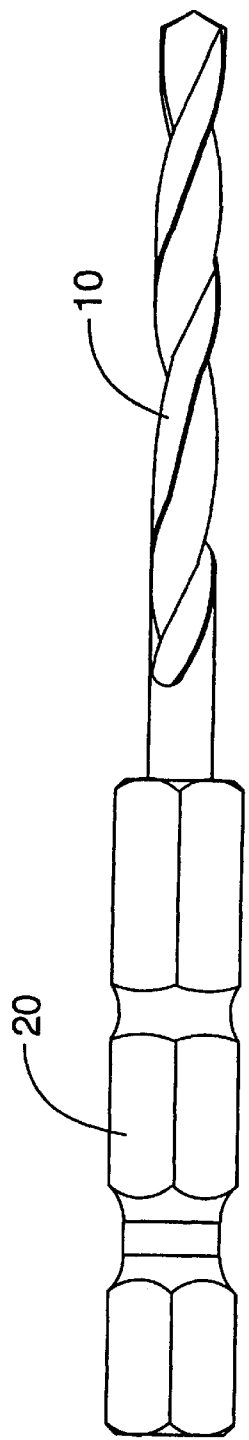
FIG. 1B is a side view of the drill bit according to FIG. 1A.
Figure 1C:
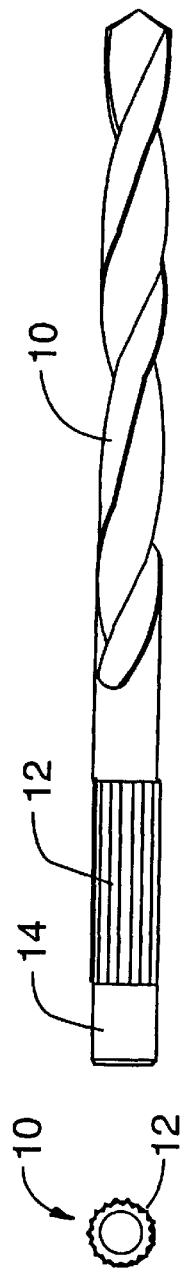
FIG. 1C is a side view of the drill portion according to FIG. 1A.
Figure 1D:
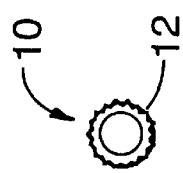
FIG. 1D is an end view of the drill according to FIG. 1C, showing the knurled end of the drill.

The two-piece drill bit has a drill portion 10 and a hexagonal shank 20. The proximal end of the drill portion is installed in an axial hole 25 in the distal end of the shank. Although some applications could be envisioned where a shape other than hexagonal could be used i.e. for a chuck or holder designed to receive other shapes, the hexagonal shape is preferred, for installation in a hexagonal holder or conventional chuck. As is well-known, the holder may include a spring-loaded ball cooperating with a detent groove 24 in the shank, to retain the drill bit in the holder.

In the preferred embodiment, illustrated in FIGS. 1A–1D, a section of the drill bit portion near its proximal end is provided with knurling 12. Preferably a lead-in portion 14 immediately adjacent the proximal end is unknurled, to facilitate starting the drill portion into the axial hole and to ensure proper concentricity as it is inserted. The shank preferably has a circumferential groove 24, to cooperate with retaining means (not shown) or the holder, such as the previously-mentioned spring-loaded ball. The distal end of the drill portion has spiral grooves and a cutting head forming a traditional drill.

Figure 1E:
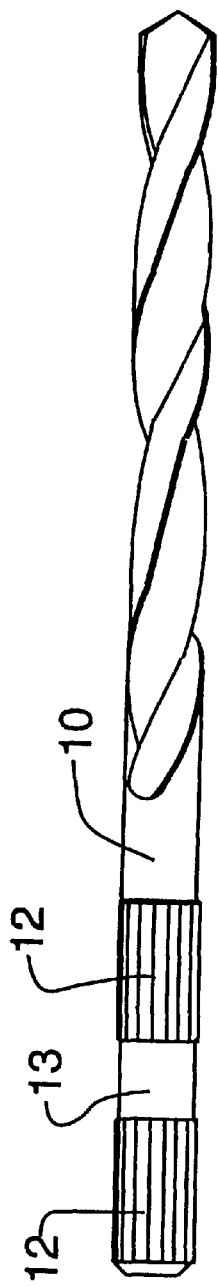
FIG. 1E is a side view of a variation of the first embodiment of the drill portion.
Figure 1F:
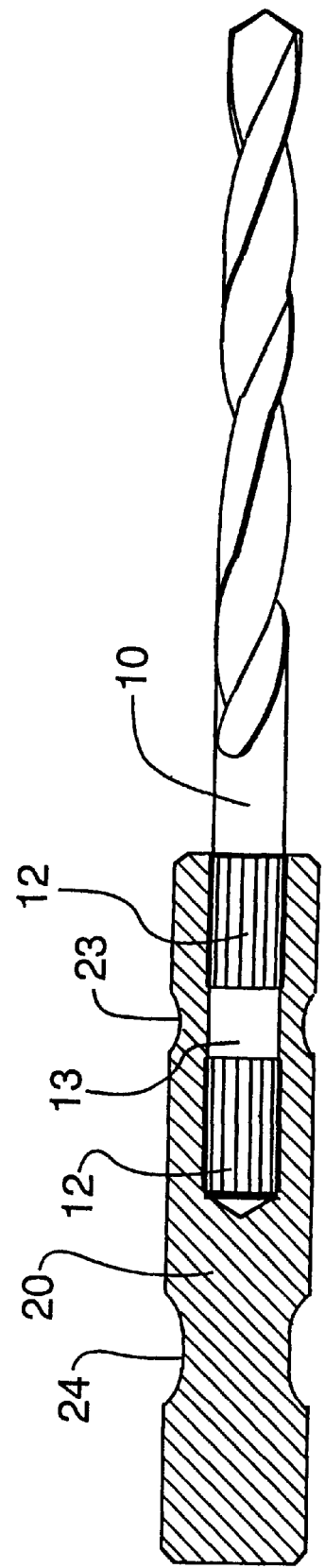
FIG. 1F is a sectional side view of the variation of the first embodiment of the drill portion.
Figure 3A:
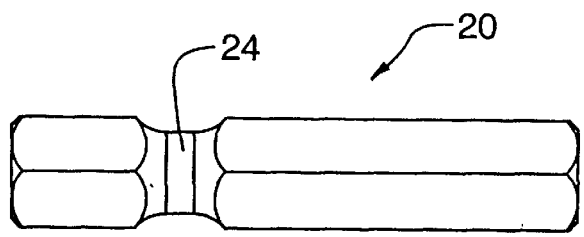
FIG. 3A is a side view of the hex shaft according to FIG. 1A.
Figure 3B:
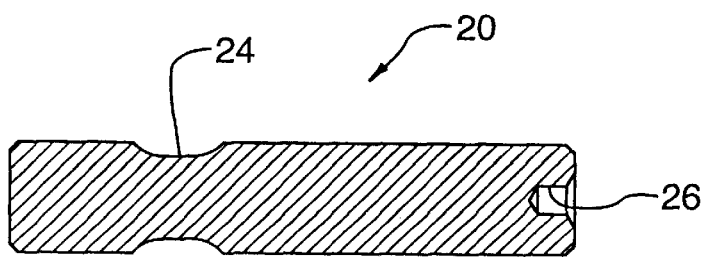
FIG. 3B is a sectioned side view of the hex shaft according to FIG. 3A.
Figure 3C:
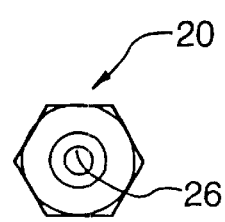
FIG. 3C is an end view of the hex shaft according to FIG. 3B, as seen from the distal end, showing the hex shaft after it has received a spot/centre drill for marking the location of the axial hole to be bored.
Figure 3D:
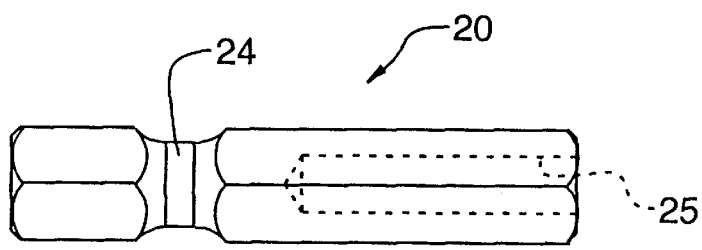
FIG. 3D is a side view of the hex shaft according to FIG. 3A, showing the outlines of the finished axial hole.
Figure 3E:
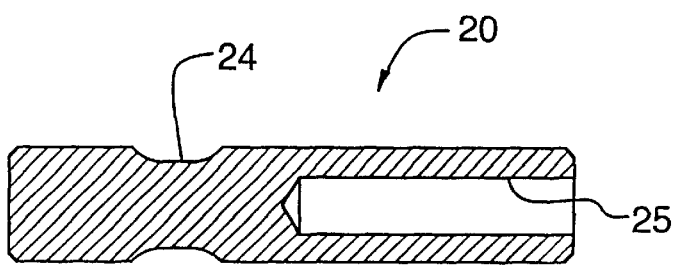
FIG. 3E is a sectional view of the hex shaft according to FIG. 3D.
Figure 3F:
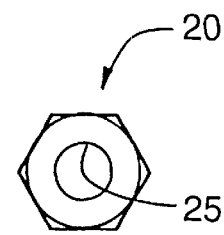
FIG. 3F is an end view of the hex shaft according to FIG. 3D, as seen from the distal end, showing the hex shaft after the axial hole has been bored.

In a variation on the preferred embodiment, shown in FIGS. 1E and 1F, the proximal end of the drill portion has two knurled portions 12, separated by an unknurled portion 13. After the drill has been inserted fully into the axial hole of the hex shaft, a crimped drill retention groove 23 is formed on the shank by roll-crimping in place. The drill retention groove preferably is located directly around the unknurled portion 13. Alternatively, the roll-crimping or roll-peening 23 could be immediately adjacent the distal end of the shank, as illustrated in FIG. 2B.

In manufacturing the drill bit pre-made drills, i.e. the drill portions are fed into a knurling machine, where the shanks are knurled (splined). Shanks are cut from a coil or standard hex bars, for example using a high-speed saw, a single-spindle machine or a press standard lengths, for example 1.26 inch (32 mm). Optionally, the cut hex shafts are placed in a tumbler and processed to eliminate burrs and sharp edges. The cut shafts are then loaded into a hopper or vibratory bowl feeder and fed into a combination chamfering/notching machine, which automatically loads and chucks each shaft in turn for machining. The circumferential groove 24 is formed on the shafts in this machine. The circumferential groove is optional, but is a "standard" feature of many hex bit tools. If present, the circumferential grooves should be made according to ANSI/ASME standards (B107.4M-1995). The machining operations, though not necessarily in this order, are chamfering, facing and notching. The drill retention groove 23 is preferably formed in advance so that it can subsequently be rolled into the unknurled portion 13 of the drill portion 10. The shank 20 is first spot/centre-drilled with a hole 26, to define the starting point of the axial hole 25. Thereafter the axial hole is formed by drilling to correct depth (possibly in two or more stages and possibly with increasing diameter drills). The proximal end of the drill portion 10 is inserted into the axial hole, and the hex shaft is roll-crimped around the drill, by rolling the drill retention groove as described above. The diameter of the axial hole is preferably sized to an optimum diameter for press-fitting the drill in the axial hole before roll-crimping.

Advantageously, the hex shaft is heated before inserting the drill shank, to expand the diameter of the axial hole to facilitate fitting the drill. Optionally, the drill shank may be cooled to decrease the diameter of the drill for the same purpose. A combination of both heating the hex shaft and cooling the drill shank may be employed.

The machining and assembly operations for all embodiments of the invention may be performed on a multi-head/spindle machine.

The manufacturing methods according to the invention eliminate common problems of the hex-shank drill assemblies in that they ensure the integrity of the mating parts. The roll-crimped portion of the hex shaft, whether it is in the centre or at the end, retains the drill bit firmly and prevents removal in an axial direction. The drill bits cannot rotate in the hex shafts because the knurls/splines prevent this, and the drill bits run true relative the rotational axis of a driving tool because there is no swaging or other operation that requires heavy impact to retain the drill bits in the shafts. The high impact easily causes deflection and bending of the components.

Conventional methods of manufacturing and assembly requires the hex shafts to be chucked/re-chucked at each stage of the process. This may cause concentricity and run-out problems. Since the manufacturing process of the invention integrate the manufacturing at one multi-function station, the need for removal/replacing from chuck to chuck is eliminated. This ensures consistency of concentricity and eliminates any problems associated with run-out.

In FIGS. 2A to 2D, a second embodiment is shown, in which the knurling 12 extends the length of that portion of the proximal end of the drill portion 10 which is within the shank 20.

FIG. 3A to 3F show the shank 20 and its manufacture, including the preferred initial step of drilling a starting hole 26.

In FIGS. 4A and 4B, a third embodiment of a drill bit according to the invention is shown. The distal end of the drill portion has a tip 13, which has a polygonal cross-section. The polygonal tip further enhances the resistance against rotation of the drill in the axial hole after the roll-crimping process.

In FIGS. 5A and 5B, a fourth embodiment of a drill bit according to the invention is shown. The distal area of the drill bit has an unknurled portion 13, which has a number of protruding wings 15. The wings further enhance the resistance against rotation of the drill in the axial hole after the roll-crimping process.

In FIGS. 4A and 4B, a third embodiment of a drill bit according to the invention is shown. The distal end of the drill portion has a tip 18, which has a polygonal cross-section. The polygonal tip further enhances the resistance against rotation of the drill in the axial hole after the roll-crimping process.

In FIGS. 7A and 7B, a sixth embodiment of a drill according to the invention is shown. The distal area of the drill portion has a number of sharp edged barbed wings 17. The wings enhance the resistance against rotation and prevents removal of the drill in the axial hole after the roll-crimping process, but permit easy insertion of the drill before roll-crimping.

Figure 8A:
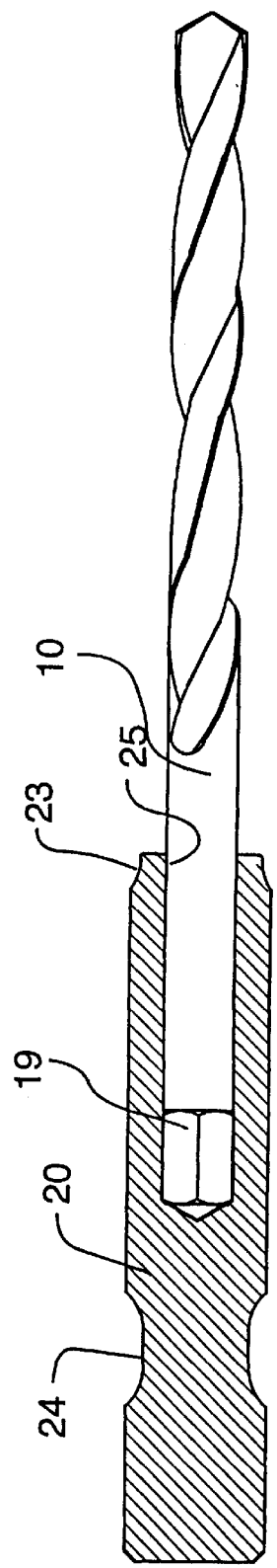
FIG. 8A is a partially sectioned side view of a seventh embodiment of a drill according to the invention.
Figure 8B:
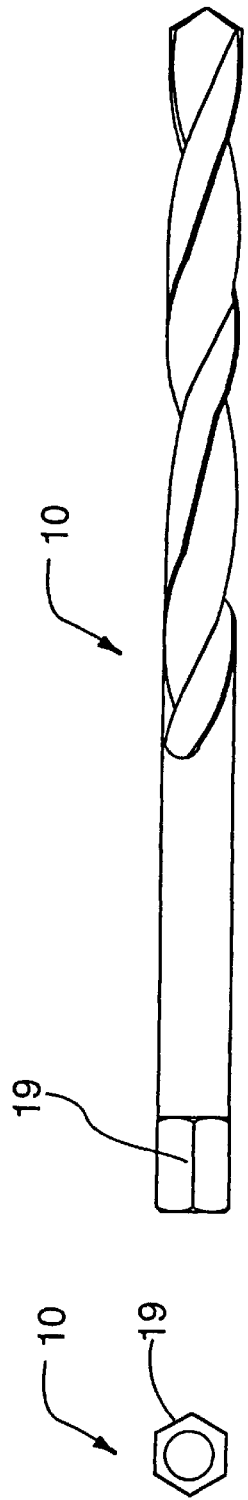
FIG. 8B is a side view of the drill according to FIG. 8A.
Figure 8C:
FIG. 8C is an end view of the drill according to FIG. 8B, showing the polygon shaped end of the drill.

In FIGS. 8A to 8C, a seventh embodiment of a drill according to the invention is shown. The proximal end of the drill portion has a polygonal shape, which enhances the resistance against rotation of the drill in the axial hole after the roll-crimping process, but permit easy insertion of the drill before roll-crimping.

In FIGS. 9A and 9B, an eighth embodiment of a drill bit according to the invention is shown. The shank 20 has a standard size portion 21 and an oversized portion 22, for accommodating a larger size drill 10, compared to earlier embodiments described. The proximal end of the drill portion has a polygonal shape, which enhances the resistance against rotation of the drill in the axial hole after three roll-crimping process, but permit easy insertion of the drill before roll-crimping.

In a ninth embodiment, shown in FIGS. 10A to 10E, the axial hole 25 can be seen to be tapered, and the proximal end of the drill portion 10 is correspondingly tapered. The drill portion may be captured by any previously-mentioned means, including for example contraction of a heated shank, but preferably a knurled portion 12 is provided as in the previous embodiments.

In all embodiments, as shown in FIGS. 12A and 12B by knurling 12', the knurling need not be longitudinal oriented. It could be, for example, in a cross-hatched pattern as shown in FIGS. 12A and 12B.

The above description relates to preferred embodiments by way of example only. However, it should be apparent to those knowledgeable in the field that many variations are possible, without departing from the spirit of the invention. Such variations are intended to be within the scope of the invention as claimed, whether or not expressly described above.

What is claimed is:

1. A two-piece drill bit having a shank tightly compressed against a drill portion, said shank having a proximal end for mounting and a distal end having an axial hole for receiving a proximal end section of said drill portion, said drill portion further comprising:

two knurled portions separated by an unknurled portion at the proximal end of said drill portion.

2. The two-piece drill bit of claim 1, wherein a number of wings extend radially outwardly from the unknurled portion.

3. A method of manufacturing a two-piece drill bit, said two-piece drill bit comprising a shank and a drill portion, said shank having a proximal end for mounting and a distal end having an axial hole for receiving a proximal end section of said drill portion, said method comprising the steps of:

forming a knurled portion on at least a portion of said proximal end section of said drill portion;

drilling an axial hole at a distal end of said shank;

inserting said proximal end section of said drill portion into said axial hole; and, mechanically deforming at least a portion of said shank to symmetrically compress said shank onto said drill portion after said insertion of said proximal end section of said drill portion into said axial hole.

4. The method of claim 3, wherein said axial hole and said proximal end section of said drill portion are correspondingly tapered.

5. The two-piece drill bit of claim 1, wherein said axial hole is tapered, and said proximal end section of said drill portion is correspondingly tapered.

6. The method of claim 3, wherein the step of mechanically deforming includes rolling, peening, roll-peening, and pressing.

7. The method of claim 3, wherein the step of forming a knurled portion includes forming a cross-hatched pattern.

8. The method of claim 3, wherein the step of forming includes forming wings extending radially outwardly on the portion of said proximal end section of said drill portion.

9. The two-piece drill bit of claim 1, wherein said shank has a proximal portion having one cross-sectional dimension, and a distal portion having a large cross-sectional dimension, said distal portion accommodating drill portions of a larger diameter than if said distal portion was of the same cross-sectional dimension as said proximation portion.

10. A two-piece drill bit having a shank tightly compressed against a drill portion, said shank having a proximal end for mounting and a distal end having an axial hole for receiving a proximal end section of said drill portion, comprising:

wings extending radially outwardly from said proximal end section of said drill portion.

11. The two-piece drill bit of claim 10, wherein said wings include barbed wings.

12. The method of claim 3, wherein the step of forming includes forming barbed wings extending radially outwardly on the portion of said proximal end section of said drill portion.

13. A two-piece drill bit having a shank tightly compressed against a drill portion, said shank having a proximal end for mounting and a distal end having an axial hole for receiving a proximal end section of said drill portion, characterized by said axial hole being tapered, and said drill portion having a correspondingly tapered proximal end, said drill portion comprising:

a knurled portion at said tapered proximal end of said drill portion; and, an unknurled portion adjacent said tapered proximal end section of said drill portion.

14. The two-piece drill bit of claim 13, wherein the knurled portion has cross-hatched pattern.

* * * * *

UNITED STATES PATENT AND TRADEMARK OFFICE
CERTIFICATE OF CORRECTION

PATENT NO.    : 6,572,311 B2
DATED         : June 3, 2003
INVENTOR(S)   : Vasudeva, Kailash C.

It is certified that error appears in the above-identified patent and that said Letters Patent is hereby corrected as shown below:

Column 5,
Line 12, delete "13" and insert therefor -- 18 --
Lines 22 to 27, delete "In FIGS. 4A and 4B, a third embodiment of a drill bit according to the invention is shown. The distal end of the drill portion has a tip 18, which has a polygonal cross-section. The polygonal tip further enjances the resistance against rotation of the drill in the axial hole after the roll-crimping process." and insert therefor -- In FIGS. 6A and 6B, a fifth embodiment of a drill bit according to the invention is shown. The distal area of the drill portion has a groove 16, which cooperates with the roll-crimped portion of the shank 20 allowing material from the shank to flow into the groove to thereby securely hold the drill in the shank (after roll-crimping). --

Signed and Sealed this

Thirteenth Day of April, 2004

JON W. DUDAS
*Acting Director of the United States Patent and Trademark Office*